Figure 1:
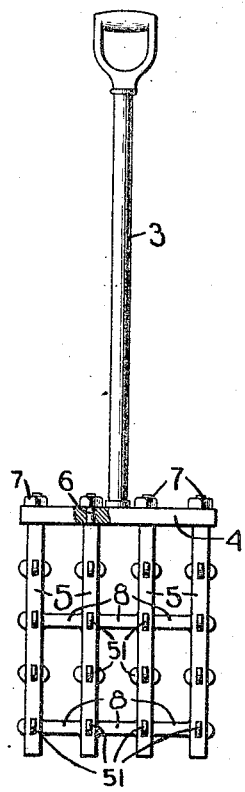

A. B. DODGE.
IMPLEMENT FOR FINISHING AND PUDDLING CONCRETE.
APPLICATION FILED MAR. 29, 1912.

1,162,462.

Patented Nov. 30, 1915.

Inventor.
Arthur B. Dodge
by Heard Smith & Tennant.
Attys.

UNITED STATES PATENT OFFICE.

ARTHUR B. DODGE, OF CAMBRIDGE, MASSACHUSETTS.

IMPLEMENT FOR FINISHING AND PUDDLING CONCRETE.

1,162,462.     Specification of Letters Patent.     Patented Nov. 30, 1915.

Application filed March 29, 1912. Serial No. 687,106.

*To all whom it may concern:*

Be it known that I, ARTHUR B. DODGE, a citizen of the United States, residing at Cambridge, county of Middlesex, State of Massachusetts, have invented an Improvement in Implements for Finishing and Puddling Concrete, of which the following description, in connection with the accompanying drawing, is a specification, like characters on the drawing representing like parts.

This invention has for its object to provide a novel implement adapted for use in concrete work for giving a smooth finish to concrete beams, posts, or other structures, and which is also of use in puddling concrete and preventing the formation of voids therein.

The features wherein my invention resides will first be described and then pointed out in the appended claim.

Figure 2:
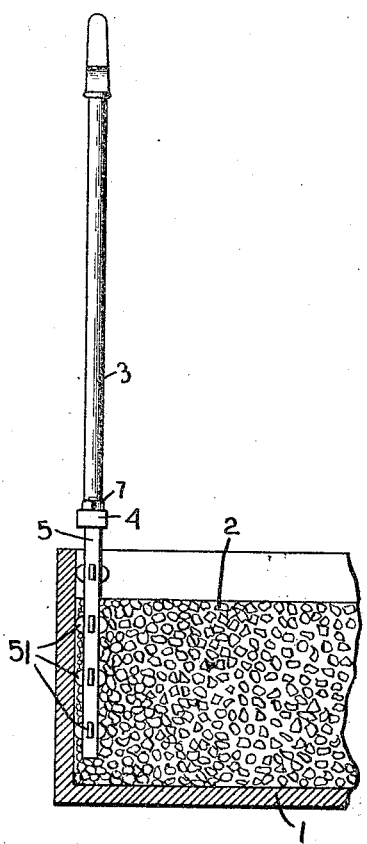
Figure 3:
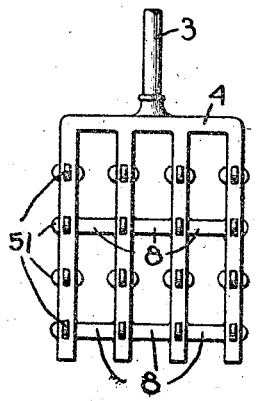
Figure 4:
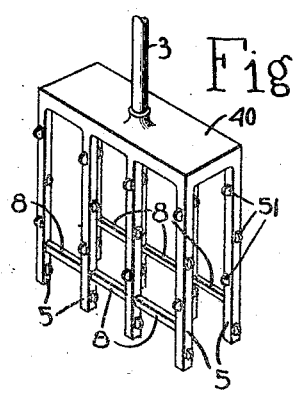

Referring to the drawings wherein I have shown some embodiments of my invention, Figure 1 is a view of an implement made in the form of a fork and embodying the invention; Fig. 2 shows how the device is used; Figs. 3 and 4 show different embodiments of the invention.

In Fig. 2 I have shown at 1 a form for molding a concrete structure, and 2 represents the concrete therein. Concrete as used in building operations is formed by mixing broken stone and sand with some cementitious substance and when the concrete is poured some of the broken stone will naturally occupy a position against the form and will consequently be visible when the form is removed. In many cases a concrete structure with a smooth surface is desirable, and to supply this end, it has been the common practice heretofore to insert an ordinary spade or shovel into the form close to the wall thereof, and work said spade up and down thereby to force the stones and coarse ingredients of the cement away from the wall so as to allow the finer ingredients to fill the space close to the wall.

The object of my invention is to provide a novel implement for this purpose which is more effective in operation than the ordinary spade.

My implement comprises a handle and one or more tines secured thereto to form a sort of fork structure, said tines having projections extending therefrom at different angles and being connected near their lower end.

In Figs. 1 and 2 I have shown an implement comprising the handle 3 of any suitable construction provided at one end with a head 4 to which a plurality of tines 5 are secured. Each tine is provided with a plurality of projections 51 which extend therefrom at different angles and the tines are connected by one or more bars or webs 8. The tines may either be made integral with the head 4 or removable therefrom. In Figs. 1 and 2 I have shown a construction in which the tines are removable from the head, while in Fig. 3 I have shown a construction in which the tines are integral with the head. In the construction shown in Figs. 1 and 2 each tine has a neck 6 at one end which extends through an aperture in the head 4, each neck having a nut 7 applied thereto by which it is firmly but detachably held in position. This implement is used as shown in Fig. 2, that is, by inserting it in the mass of concrete 2 directly against the wall of the form 1, and then working said device up and down in the concrete thereby to force the coarse material away from the wall and allow the finer ingredients of concrete to come into position against the wall.

In Fig. 4 I have shown an embodiment of my invention wherein the device is provided with a plurality of rows of tines. In this device the head 40 which is secured to the handle 3 is wide enough to receive two rows of tines 5. A device having this construction is useful in assisting to force the concrete into different parts of a concrete mold so as to prevent the formation of voids in the concrete. My invention, therefore, is useful not only for giving a smooth finish to the exterior surface of the concrete structure, but is also useful for puddling concrete to prevent the formation of voids therein.

Having thus described my invention what I claim as new and desire to secure by Letters Patent is:—

In a device of the class described, the combination with a handle having a head, of a plurality of fingers extending from said head and each having projections extending therefrom at different angles, and a bar connecting said fingers near their lower end.

In testimony whereof, I have signed my name to this specification, in the presence of two subscribing witnesses.

ARTHUR B. DODGE.

Witnesses:
 Louis C. Smith,
 Thomas J. Drummond.